US009925946B2

(12) United States Patent
Webber et al.

(10) Patent No.: US 9,925,946 B2
(45) Date of Patent: Mar. 27, 2018

(54) LOW MASS PASSENGER AIRBAG (71) Applicants: James Webber, Shelby Township, MI (US); Jonathan R. Vanderbossche, White Lake, MI (US); Gregory A. Nestico, Canton, MI (US)

(72) Inventors: James Webber, Shelby Township, MI (US); Jonathan R. Vanderbossche, White Lake, MI (US); Gregory A. Nestico, Canton, MI (US)

(73) Assignee: FCA US LLC, Auburn Hills, MI (US)

( * ) Notice: Subject to any disclaimer, the term of this patent is extended or adjusted under 35 U.S.C. 154(b) by 7 days.

(21) Appl. No.: 14/959,320

(22) Filed: Dec. 4, 2015

(65) Prior Publication Data
US 2017/0158157 A1 Jun. 8, 2017

(51) Int. Cl.
*B60R 21/217* (2011.01)
*B60R 21/201* (2011.01)
*B60R 21/16* (2006.01)

(52) U.S. Cl.
CPC ........ *B60R 21/2176* (2013.01); *B60R 21/201* (2013.01); *B60R 2021/161* (2013.01)

(58) Field of Classification Search
CPC ............. B60R 21/2176; B60R 21/201; B60R 2021/161; B60R 21/205
See application file for complete search history.

(56) References Cited

U.S. PATENT DOCUMENTS

| 4,153,273 | A | * | 5/1979 | Risko | B60R 21/2171 |
| | | | | | 280/728.2 |
| 4,842,300 | A | * | 6/1989 | Ziomek | B60R 21/205 |
| | | | | | 280/732 |
| 5,234,227 | A | * | 8/1993 | Webber | B60R 21/2171 |
| | | | | | 280/728.1 |
| 5,303,951 | A | | 4/1994 | Goestenkors et al. | |
| 5,306,042 | A | * | 4/1994 | Frank | B60R 21/16 |
| | | | | | 280/728.3 |
| 5,342,090 | A | * | 8/1994 | Sobczak | B60R 21/2171 |
| | | | | | 280/728.3 |
| 5,393,090 | A | | 2/1995 | Shepherd et al. | |
| 5,613,704 | A | * | 3/1997 | White, Jr. | B60R 21/2176 |
| | | | | | 280/728.2 |
| 5,765,867 | A | * | 6/1998 | French | B60R 21/16 |
| | | | | | 280/743.1 |
| 5,794,967 | A | * | 8/1998 | Manire | B60R 21/2171 |
| | | | | | 280/728.3 |
| 5,806,879 | A | * | 9/1998 | Hamada | B60R 21/2171 |
| | | | | | 280/728.2 |
| 5,918,901 | A | * | 7/1999 | Johnson | B60R 21/276 |
| | | | | | 280/738 |
| 5,979,929 | A | * | 11/1999 | Stanger | B60R 21/2171 |
| | | | | | 280/728.2 |

(Continued)

*Primary Examiner* — Paul N Dickson
*Assistant Examiner* — Timothy Wilhelm
(74) *Attorney, Agent, or Firm* — Ralph E. Smith (57) ABSTRACT

An airbag module including an airbag, comprising an elongated backbone, and an airbag housing having the airbag therein coupled to the backbone. A sleeve is secured about the airbag housing, and coupled to the backbone. The module also includes tubular chute having open ends that receives the elongated backbone, airbag housing, and sleeve therein, wherein the airbag housing restricts expansion of the airbag through the open ends of the tubular chute during deployment of the airbag.

18 Claims, 5 Drawing Sheets

(56) References Cited

U.S. PATENT DOCUMENTS

| | | | | |
|---|---|---|---|---|
| 6,039,341 A * | 3/2000 | Doxey | ................ | B60R 21/2176 280/728.2 |
| 6,139,082 A * | 10/2000 | Davis, Jr. | ............. | B62D 25/145 280/752 |
| 6,325,415 B1 * | 12/2001 | Zelinski | ................ | B60R 21/215 280/728.1 |
| 6,467,798 B2 * | 10/2002 | Inomata | ................ | B60R 21/205 280/728.2 |
| 6,692,017 B2 * | 2/2004 | Taoka | ................... | B60R 21/201 280/728.2 |
| 6,820,892 B2 * | 11/2004 | Yokoyama | .......... | B60R 21/2171 280/728.2 |
| 6,840,536 B2 * | 1/2005 | Ahn | .................... | B60R 21/2171 280/728.2 |
| 6,929,281 B2 * | 8/2005 | Loeper | ................ | B60R 21/2155 280/728.3 |
| 7,097,196 B2 * | 8/2006 | Chavez | ............... | B60R 21/2171 280/728.2 |
| 7,188,860 B2 * | 3/2007 | Hayashi | ................ | B60R 21/205 280/728.2 |
| 7,255,365 B2 * | 8/2007 | Geyer | ................. | B60R 21/2171 280/728.2 |
| 7,261,318 B2 * | 8/2007 | Enders | ................. | B60R 21/206 280/732 |
| 7,290,790 B2 * | 11/2007 | Kielinen | ............... | B60R 21/205 280/728.2 |
| 7,377,539 B2 * | 5/2008 | Tsujimoto | ............. | B60R 21/205 280/728.2 |
| 7,407,180 B2 * | 8/2008 | Yokoyama | ........... | B60R 21/205 280/728.2 |
| 7,431,326 B2 * | 10/2008 | Tsujimoto | ........... | B60R 21/2171 280/728.2 |
| 7,654,556 B2 * | 2/2010 | Vigeant | ................. | B60R 21/201 280/728.2 |
| 7,695,013 B2 * | 4/2010 | Kakstis | ................... | B60R 21/20 280/743.1 |
| 7,806,430 B2 * | 10/2010 | Cowelchuk | ......... | B60R 21/2165 280/728.3 |
| 7,946,620 B2 * | 5/2011 | Vigeant | ................. | B60R 21/201 280/743.1 |
| 8,016,317 B1 * | 9/2011 | Bruyneel | ............ | B60R 21/2171 280/728.2 |
| 8,146,942 B2 * | 4/2012 | Bruning | ................ | B60R 21/205 280/728.2 |
| 8,419,048 B2 * | 4/2013 | Yamaji | .................. | B60R 21/201 280/728.2 |
| 8,500,155 B2 * | 8/2013 | Enders | .................. | B60R 21/205 280/728.3 |
| 8,540,274 B2 * | 9/2013 | Bristol | .................. | B60R 21/205 280/728.2 |
| 8,585,079 B2 * | 11/2013 | Gorman | ................ | B60R 21/207 280/728.2 |
| 8,651,524 B2 * | 2/2014 | Hardin | ................. | B60R 21/201 280/743.1 |
| 8,690,184 B2 * | 4/2014 | Yoshimura | ............ | B60R 21/217 280/728.2 |
| 8,783,711 B2 * | 7/2014 | Webber | ............... | B60R 21/2155 280/728.2 |
| 9,376,082 B2 * | 6/2016 | Osterfeld | ............ | B60R 21/2176 |
| 2002/0084630 A1 * | 7/2002 | Aulbach | ............... | B60R 21/207 280/728.2 |
| 2004/0080146 A1 * | 4/2004 | Lutz | .................... | B60R 21/2171 280/736 |
| 2007/0278773 A1 * | 12/2007 | Cowelchuck | ......... | B60R 21/205 280/732 |
| 2010/0181746 A1 * | 7/2010 | Rose | ................... | B60R 21/2171 280/736 |

* cited by examiner

LOW MASS PASSENGER AIRBAG

FIELD

The present disclosure relates to an airbag module of a motor vehicle and, specifically, to an airbag module for a passenger-side of a motor vehicle.

BACKGROUND

Figure 8:
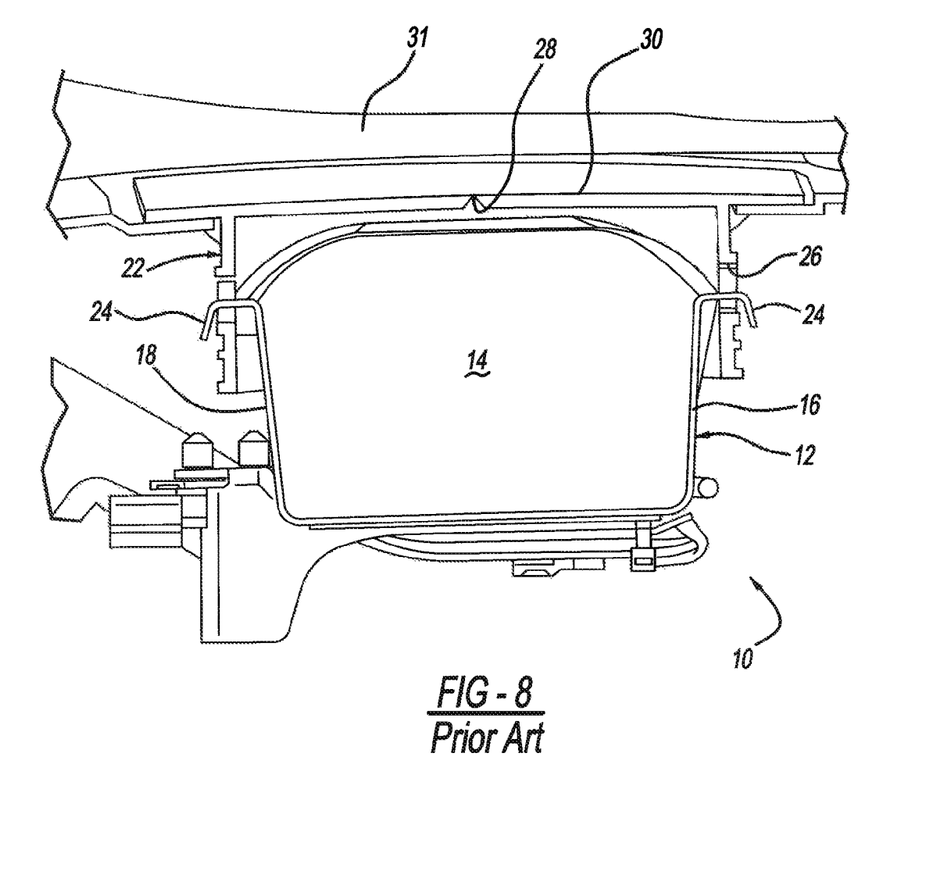
FIG. 8 is a cross-sectional view of a conventional airbag module mounted to a support of a vehicle.

FIG. 8 illustrates a conventional passenger-side airbag module 10. Airbag module 10 includes a housing 12 that includes an airbag 14. Housing 12 is generally rectangular-shaped, and includes sidewalls 16 and 18. To inflate airbag 14, airbag module 10 also includes an inflator (not shown) that rapidly releases gas to inflate airbag 14.

To enclose housing 12 after airbag 14 has been folded therein, airbag module 10 includes a chute 22 that attaches to housing 12 via hook-shaped tabs 24 that engage with apertures 26 formed in chute 22. Chute 22 includes a seam 28 formed in an upper surface 30 thereof. During deployment of airbag 14, seam 28 will open and allow airbag 14 to escape housing 12 and chute 22. Upper surface 30 of chute 22 is engaged with an underside of the passenger-side instrument panel 31, with a foam material (not shown) therebetween. To assist in ensuring that airbag 14 properly deploys, the instrument panel may also include a seam (not shown) that is aligned with seam 28 of chute 22. Accordingly, when airbag 14 is inflated and seam 28 of chute 22 opens, the seam (not shown) of the instrument panel will also open to allow airbag 14 to fully inflate.

During release of the rapidly expanding gas from inflator 20, forces will be experienced by airbag module 10 in all directions. That is, the force of the rapidly expanding gas is not only directed toward seam 28 of chute 22 to open seam 28, but rather the force will be directed at sidewalls 16 and 18 of housing 12 as well. To ensure that housing 12 maintains structural integrity while experiencing these forces, housing 12 is formed of rigid materials such as heavy gauge steel. The use of such rigid materials for housing 12 can increase the mass of airbag module 10, as well as increase the mass of the vehicle. Further, because the force of the rapidly expanding gas is released in all directions, only a portion of the force of the rapidly expanding gas is used to open seam 28 of chute 22 and to open the seam (not shown) of the instrument panel (not shown). As only a portion of the force is used to open seam 28, seam 28 may not fully open, which is undesirable.

Moreover, to increase fuel economy of motor vehicles, there is a continual push to develop vehicles having lower mass. As such, considerable efforts are being made to use and develop devices and materials for motor vehicles that can assist in the reduction of mass of the vehicle. Accordingly, it is desirable to produce an airbag module that is lower in mass, but more effective in ensuring that the airbag properly deploys.

SUMMARY

According to a first aspect of the present disclosure, an airbag module including an airbag is provided that includes an elongated backbone, and an airbag housing having the airbag therein coupled to the backbone. A sleeve is secured about the airbag housing, and coupled to the backbone. The module also includes tubular chute having open ends that receives the elongated backbone, airbag housing, and sleeve therein, wherein the airbag housing restricts expansion of the airbag through the open ends of the tubular chute during deployment of the airbag.

According to the first aspect of the present disclosure, the tubular chute is formed of a flexible thermoplastic elastomer.

According to the first aspect of the present disclosure, the airbag housing is formed of a fabric or mesh material.

According to the first aspect of the present disclosure, the airbag housing includes a plurality of first straps that secure the airbag housing to the elongated backbone.

According to the first aspect of the present disclosure, the backbone includes a plurality of L-shaped flanges extending therefrom, and the first straps pass between adjacent L-shaped flanges.

According to the first aspect of the present disclosure, the sleeve includes a plurality of second straps that secure the sleeve to the elongated backbone.

According to the first aspect of the present disclosure, the second straps pass between adjacent L-shaped flanges.

According to the first aspect of the present disclosure, the chute defines an elongate channel that is configured to slidably mate with the backbone.

According to the first aspect of the present disclosure, the channel includes a pair of opposing recesses that extending along a length of channel that are configured to receive the L-shaped flanges therein.

According to the first aspect of the present disclosure, the recesses are defined by a lip that is operable to contact a surface of each of the L-shaped flanges.

According to a second aspect of the present disclosure, a method of assembling an airbag module is provided that includes coupling an airbag housing having an airbag therein to an elongated backbone member. A fabric sleeve is then positioned about the airbag housing, and the fabric sleeve is coupled to the backbone in a manner that compresses the airbag housing. A tubular chute is slid over the elongated backbone having the airbag housing and sleeve secured thereto, wherein the tubular chute is configured to slidably mate with the elongated backbone.

According to the second aspect of the present disclosure, the tubular chute is formed of a flexible thermoplastic elastomer.

According to the second aspect of the present disclosure, the airbag housing is formed of a fabric or mesh material.

According to the second aspect of the present disclosure, the coupling of the airbag housing to the elongated backbone includes a wrapping plurality of first straps around the backbone.

According to the second aspect of the present disclosure, the backbone includes a plurality of L-shaped flanges extending therefrom, and the first straps are passed between adjacent L-shaped flanges.

According to the second aspect of the present disclosure, the coupling of the sleeve to the elongated backbone includes wrapping a plurality of second straps around the elongated backbone.

According to the second aspect of the present disclosure, the second straps are passed between adjacent L-shaped flanges.

According to the second aspect of the present disclosure, the chute defines an elongate channel that is configured to slidably mate with the backbone.

According to the second aspect of the present disclosure, the channel includes a pair of opposing recesses that extend along a length of channel that are configured to receive the L-shaped flanges therein.

According to the second aspect of the present disclosure, the recesses are defined by a lip that is operable to contact a surface of each of the L-shaped flanges.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

The present disclosure provides an airbag module that has reduced mass, as well as an improved seam release mechanism that assists in ensuring that the airbag will properly deploy during inflation thereof. Although the below description will primarily be directed to an airbag module designed for use as a passenger-side airbag module, the present disclosure should not be limited thereto. Rather, it should be understood that the teachings of the present disclosure are equally applicable to a driver-side airbag module or a side-curtain airbag module without departing from the scope of the present disclosure.

Figure 1:
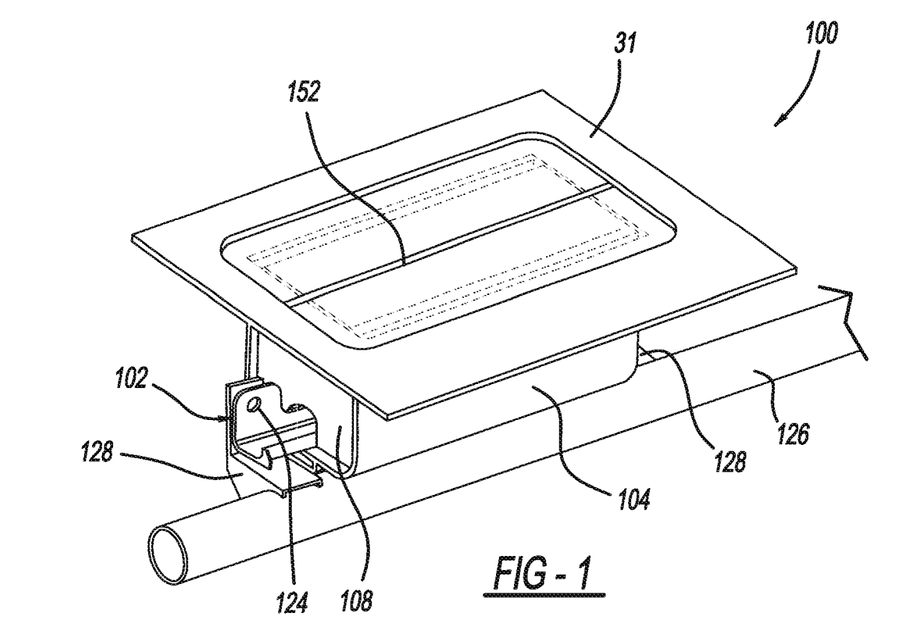
FIG. 1 is a perspective view of an airbag module according to the present disclosure mounted to a mounting surface of a vehicle.
Figure 2:
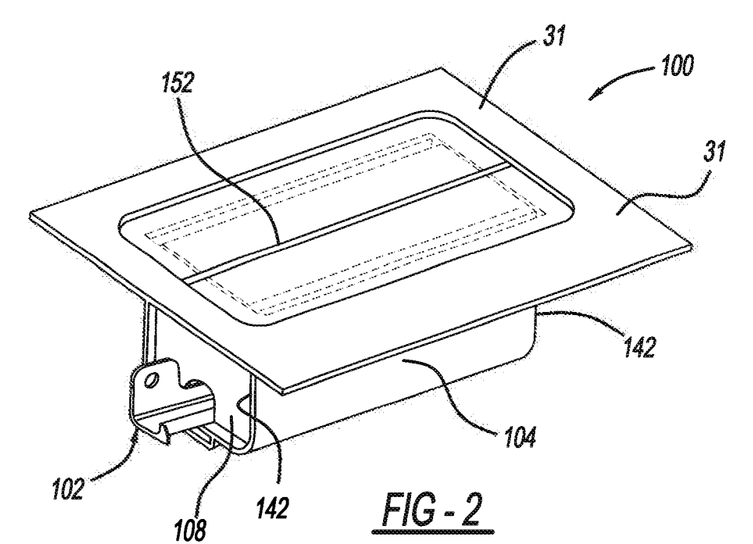
FIG. 2 is a perspective view of the airbag module illustrated in FIG. 1.
Figure 3:
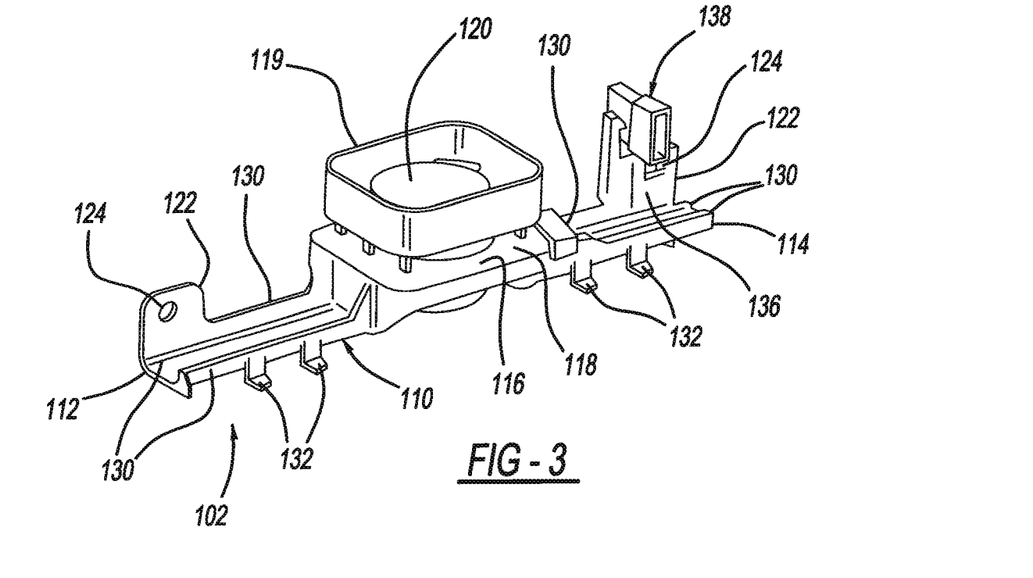
FIG. 3 is a perspective view of a frame of the airbag module according to the present disclosure.
Figure 4:
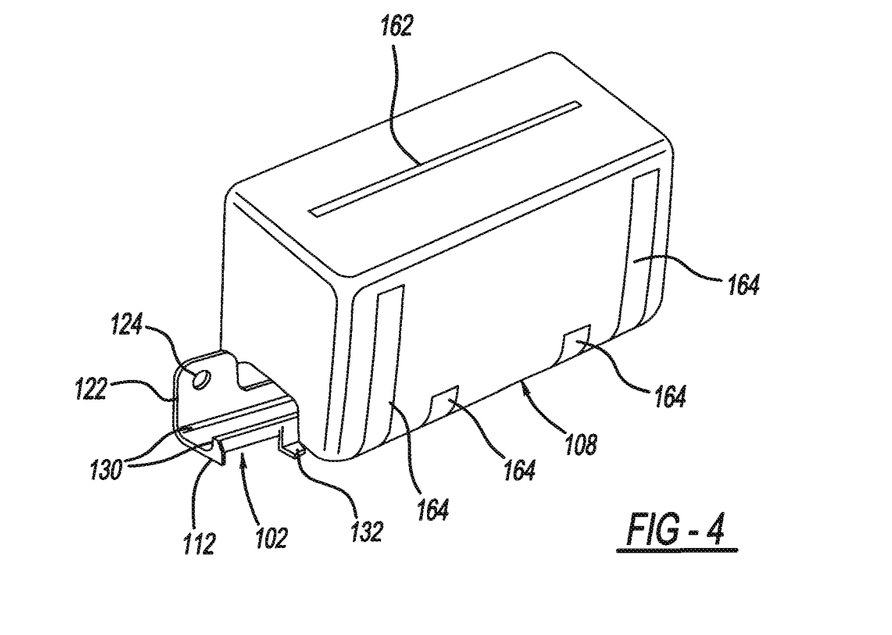
FIG. 4 is a perspective view of an airbag housing including an airbag mounted to the frame illustrated in FIG. 3.

Referring to FIGS. 1-7, an exemplary airbag module 100 in accordance with the present disclosure is illustrated. Airbag module 100 may include a frame or backbone 102, a chute 104, a sleeve or wrap 106 (best shown in FIG. 5), and an airbag housing 108. As best shown in FIG. 3, backbone 102 is a elongate member 110 including a first end 112, a second end 114, and a planar support 116 positioned between first end 112 and second end 114. Planar support 116 provides a mounting surface 118 for a cushion retainer 119, which also includes an inflator device 120. Cushion retainer 119 and inflator device 120 may be fixed to a backbone 102 using a plurality of fasteners (not shown).

First and second ends 112 and 114 each define a mounting flange 122 including an aperture 124 for fixedly securing backbone 102 and airbag module 100 to a cross-vehicle support beam 126 with a pair of fasteners (not shown). In this regard, cross-vehicle support beam 126 includes a pair of mounting brackets 128 that correspond to each mounting flange 122. It should be understood, however, that backbone 102 is not necessarily attached to cross-vehicle support beam 126. Rather, backbone 102 may be fixed to any rigid support structure located within the instrument panel (not shown) of the vehicle.

Backbone 102 includes a plurality of structural ribs 130 that extend between first end 112 and planar support 116, and between second end 114 and planar support 116 to increase the structural rigidity of backbone 102. In addition, backbone 102 includes a plurality of L-shaped flanges 132 that assist in locating backbone 102 between mounting brackets 128, and also provide passage for straps 134 (FIG. 7) of sleeve 106 to attach sleeve 106 to backbone 102.

Backbone 102 also includes a connector flange 136 for mounting an electrical connector assembly 138 that provides for electrical communication between airbag module 100 and either various sensors (e.g., collision-detection sensors, occupancy sensors, etc.—not shown) or the vehicles central processing unit (CPU—not shown). To reduce mass of airbag module 100, backbone 102 is preferably formed of a rigid plastic material such as glass-reinforced polyamide (i.e., nylon). It should be understood, however, that other rigid plastic materials and light-weight metal materials such as aluminum are contemplated.

Chute 104 is attached to backbone 102. In accordance with the present disclosure, chute 104 is a tubular member 140 that is formed of a rigid, yet soft and flexible material such as a thermoplastic elastomer. Tubular member 140 of chute 104 includes opposing open ends 142, a pair of side walls 144, a lower surface 146, and an upper surface 148. A seam 150 is formed in upper surface 148 of chute 104. Seam 150 is designed to open during deployment of the airbag from airbag housing 108, and corresponds to another seam 152 formed in a passenger-side instrument panel 31.

Figure 7:
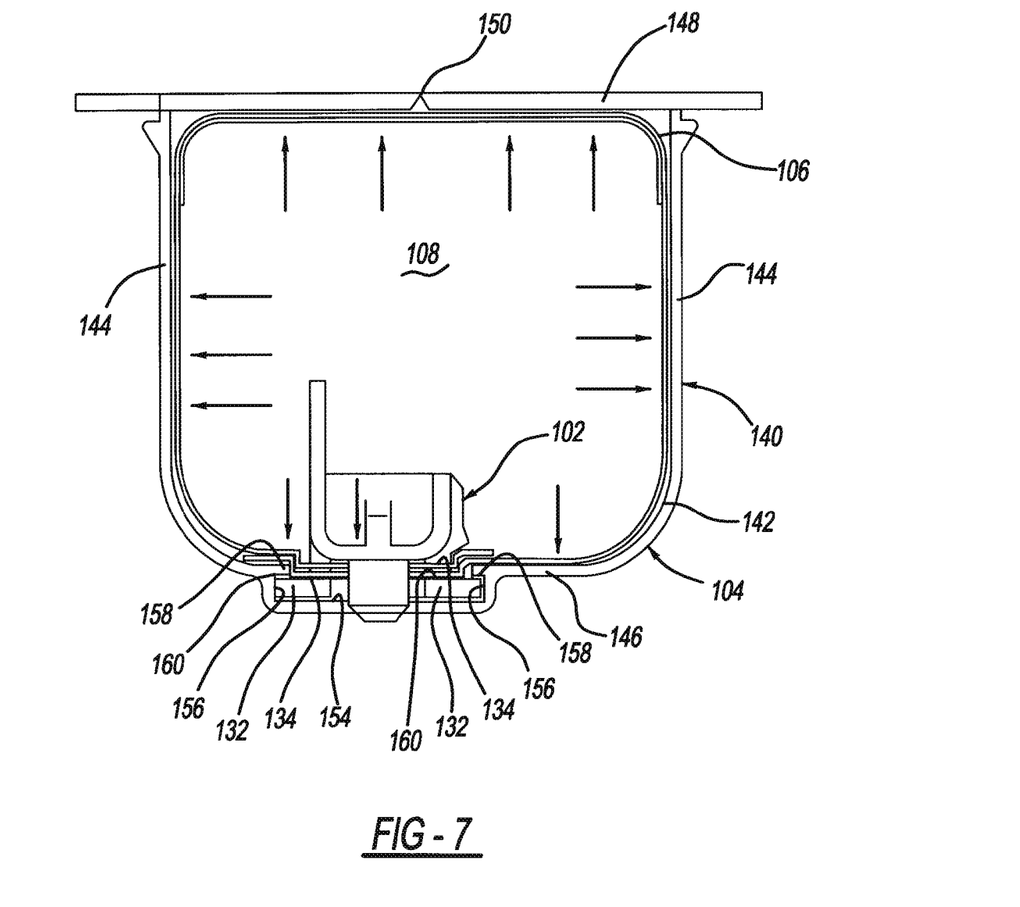
FIG. 7 is a side perspective view of the chute positioned about the sleeve, airbag housing, and frame illustrated in FIG. 6.

As best shown in FIG. 7, lower surface 146 of chute 104 defines an elongate channel 154 configured to slidably mate with backbone 102. Channel 154 extends along an entire length of chute 104, and includes a pair of opposing recesses 156 extending along an entire length of channel 154 that are configured to receive L-shaped flanges 132 therein. In this regard, recesses 156 are defined by a lip 158 that is operable to contact a surface 160 of L-shaped flanges 132. Thus, chute 104 may be secured to backbone 102 in a manner sufficient to maintain attachment during deployment of airbag from airbag housing 108. Although chute 104 is illustrated as being parallelpiped in shape, it should be understood that chute 104 can be cylindrical without departing from the scope of the present disclosure.

During inflation of the airbag, rapidly expanding gas is released by inflator device 120. As gases released by inflator device 120 begin to fill the airbag within the airbag housing 108, the airbag will expand in all directions, as indicated by the arrows in FIG. 7. That is, the airbag will begin expanding in a direction toward opposing open ends 142, side walls 144, lower surface 146, and upper surface 148. To assist in preventing the airbag from expanding outward through opposing open ends 142, the airbag is positioned within airbag housing 108. Housing 108 may be formed from a dense fabric material, or some other lightweight material such as steel or aluminum mesh that reduces the mass of airbag module 100. Regardless, airbag housing 108 assists in preventing, or least substantially minimizing, the airbag from expanding outward from open ends 142 of chute 104. That is, airbag housing 108 focuses the expanding airbag toward a seam 162 formed in airbag housing 108 that corresponds to and is essentially aligned with seams 150 and 152 of chute and instrument panel 31, respectively. To secure airbag housing 108 to backbone 102, airbag housing 108 includes straps 164 that are sized to wrap about backbone 102 and fit between adjacent L-shaped flanges 132 to secure housing 108 to backbone 102.

Figure 5:
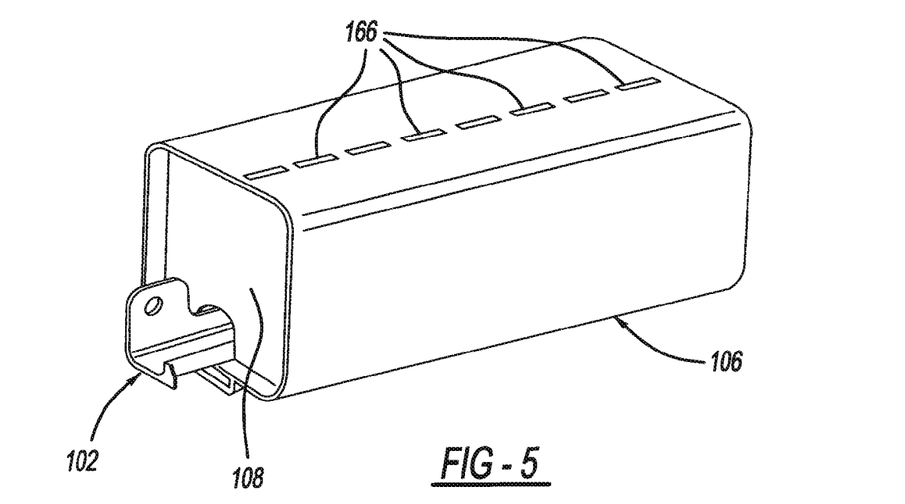
FIG. 5 is a perspective view of a sleeve wrapped about the airbag housing mounted to the frame illustrated in FIG. 4.
Figure 6:
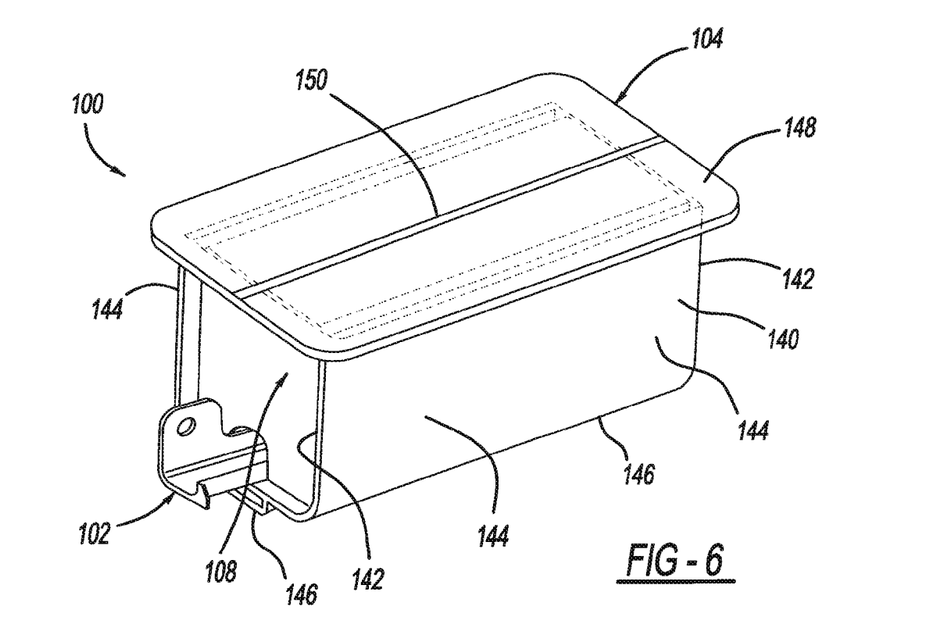
FIG. 6 is a perspective view of a chute positioned about the sleeve, airbag housing, and frame illustrated in FIG. 5.

Now referring to FIGS. 5 and 7, sleeve 106 is illustrated as being a tubular fabric member that wraps about airbag housing 108. The fabric that forms sleeve 106 may be lighter in density in comparison to that of airbag housing 108. It should be understood, however, that sleeve 106 may be formed of materials other than fabric. For example, thermoplastic elastomer materials may be used. Sleeve 106 is designed to slightly compress airbag housing 108 and maintain airbag housing in an essentially tubular shape.

To secure sleeve 106 about airbag housing, sleeve 106 includes straps 134 that are configured to secure sleeve 106 about airbag housing 108 and to backbone 102 in a manner similar to straps 164 of airbag housing 108. Specifically, straps 134 are also sized to wrap about backbone 102 and fit between adjacent L-shaped flanges 132 to secure sleeve 106 to backbone 102. Sleeve 106 also includes a plurality of perforations 166 that allow sleeve 106 to rupture during deployment of the airbag from airbag housing 108. Perforations 166, therefore, are essentially aligned with seam 162 of airbag housing 108, seam 150 of chute 104, and seam 152 of instrument panel 152.

To assemble airbag module 100, cushion retainer 119, inflator 120, and electrical connector assembly 138 are first secured to backbone 102. Then, airbag housing 108 including the airbag folded therein is secured to backbone 102 by pulling straps 164 about backbone 102 and through adjacent L-shaped flanges 132. Sleeve 106 is then wrapped about airbag housing 108, and secured to backbone 102 by pulling straps 134 about backbone 102 and through adjacent L-shaped flanges 132. As noted above, sleeve 106 is tensioned about airbag housing 108 to slightly compress airbag housing 108 and maintain housing 108 in a tubular shape. The slight compression of airbag housing 108 by sleeve 106 assists in allowing tubular chute 104 to be slid over backbone 102 including the airbag housing 108 and sleeve 106 strapped thereto in a direction from first end 112 to second end 114 of backbone 102, or vice versa, to complete assembly of the airbag module 100. The airbag module 100 is now free to be coupled to mounting brackets 128 that are secured to cross-bar 126 of the vehicle.

The foregoing description has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An airbag module including an airbag, comprising:
   an elongated backbone that extends in a longitudinal direction;
   an airbag housing having the airbag therein coupled to the backbone, the airbag housing being formed of a fabric or mesh material;
   a sleeve secured about the airbag housing, and coupled to the backbone; and
   a tubular chute including open ends that receives the elongated backbone, airbag housing, and sleeve therein,
   wherein the chute defines an elongate channel that is configured to slidably mate with the backbone along the longitudinal direction, and
   wherein the airbag housing restricts expansion of the airbag through the open ends of the tubular chute during deployment of the airbag.

2. The airbag module of claim 1, wherein the tubular chute is formed of a flexible thermoplastic elastomer.

3. The airbag module of claim 1, wherein the airbag housing includes a plurality of first straps that secure the airbag housing to the elongated backbone.

4. The airbag module of claim 3, wherein the backbone includes a plurality of L-shaped flanges extending therefrom, and the first straps pass between adjacent L-shaped flanges.

5. The airbag module of claim 4, wherein the sleeve includes a plurality of second straps that secure the sleeve to the elongated backbone.

6. The airbag module of claim 5, wherein the second straps pass between adjacent L-shaped flanges.

7. The airbag module of Claim 1, wherein the channel includes a pair of opposing recesses that extending along a length of channel that are configured to receive the L-shaped flanges therein.

8. The airbag module of claim 7, wherein the recesses are defined by a lip that is operable to contact a surface of each of the L-shaped flanges.

9. A method of assembling an airbag module, comprising:
   coupling an airbag housing having an airbag therein to an elongated backbone member that extends in a longitudinal direction;
   positioning a fabric sleeve about the airbag housing, and coupling the fabric sleeve to the backbone in a manner that compresses the airbag housing; and
   sliding a tubular chute over the elongated backbone having the airbag housing and sleeve secured thereto, wherein the tubular chute is configured to slidably mate with the elongated backbone along the longitudinal direction.

10. The method of assembling an airbag module claim 9, wherein the tubular chute is formed of a flexible thermoplastic elastomer.

11. The method of assembling an airbag module claim 9, wherein the airbag housing is formed of a fabric or mesh material.

12. The method of assembling an airbag module claim 9, wherein coupling of the airbag housing to the elongated backbone includes a wrapping plurality of first straps around the backbone.

13. The method of assembling an airbag module claim 12, wherein the backbone includes a plurality of L-shaped flanges extending therefrom, and the first straps are passed between adjacent L-shaped flanges.

14. The method of assembling an airbag module claim 13, wherein coupling of the sleeve to the elongated backbone includes wrapping a plurality of second straps around the elongated backbone.

15. The method of assembling an airbag module claim 14, wherein the second straps pass between adjacent L-shaped flanges.

16. The method of assembling an airbag module claim 13, wherein the chute defines an elongate channel that is configured to slidably mate with the backbone.

17. The method of assembling an airbag module claim 16, wherein the channel includes a pair of opposing recesses that extend along a length of channel that are configured to receive the L-shaped flanges therein.

18. The method of assembling an airbag module claim 17, wherein the recesses are defined by a lip that is operable to contact a surface of each of the L-shaped flanges.

\* \* \* \* \*